(12) United States Patent
Smith et al.

(10) Patent No.: US 12,212,612 B2
(45) Date of Patent: Jan. 28, 2025

(54) PRESENTATION OF PART OF TRANSCRIPT BASED ON DETECTION OF DEVICE NOT PRESENTING CORRESPONDING AUDIO

(71) Applicant: Lenovo (Singapore) Pte. Ltd., Singapore (SG)

(72) Inventors: Joshua Smith, Milton, FL (US); Inna Zolin, Morrisville, NC (US); Carl H. Seaver, Morrisville, NC (US); Matthew Fardig, Boonville, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 352 days.

(21) Appl. No.: 17/709,786

(22) Filed: Mar. 31, 2022

(65) Prior Publication Data

US 2023/0319121 A1 Oct. 5, 2023

(51) Int. Cl.
| | |
|---|---|
| G10L 15/26 | (2006.01) |
| G10L 13/02 | (2013.01) |
| G10L 15/22 | (2006.01) |
| G10L 15/30 | (2013.01) |
| G10L 25/57 | (2013.01) |
| H04L 65/1089 | (2022.01) |
| H04L 65/403 | (2022.01) |
| H04L 65/80 | (2022.01) |
| H04M 3/56 | (2006.01) |

(52) U.S. Cl.
CPC ............ *H04L 65/403* (2013.01); *G10L 13/02* (2013.01); *G10L 15/22* (2013.01); *G10L 15/26* (2013.01); *G10L 15/30* (2013.01); *G10L 25/57* (2013.01); *H04L 65/1089* (2013.01); *H04L 65/80* (2013.01); *H04M 3/568* (2013.01); *H04M 2201/39* (2013.01)

(58) Field of Classification Search
CPC .............................. G10L 15/26; G10L 15/30
USPC ......................................................... 704/235
See application file for complete search history.

(56) References Cited

U.S. PATENT DOCUMENTS

| | | | |
|---|---|---|---|
| 2016/0182599 A1* | 6/2016 | Arenburg ................ | G10L 15/26 370/252 |
| 2017/0125019 A1* | 5/2017 | Ganesan ........... | H04M 1/72454 |
| 2021/0183394 A1* | 6/2021 | Holmes .................... | G10L 15/26 |
| 2022/0086209 A1* | 3/2022 | Suto ........................ | H04L 65/80 |
| 2022/0393898 A1* | 12/2022 | Maury ................. | H04L 12/1822 |
| 2023/0246868 A1* | 8/2023 | Garcia i Tormo ...... | G10L 15/26 709/204 |

* cited by examiner

*Primary Examiner* — Abul K Azad
(74) *Attorney, Agent, or Firm* — John M. Rogitz; John L. Rogitz

(57) ABSTRACT

In one aspect, an apparatus may include at least one processor and storage accessible to the at least one processor. The storage may include instructions executable by the at least one processor to receive a transcription of audio from a first client device. The audio may be detected at the first client device and may be streamed from the first client device as part of a video conference. The instructions may also be executable to determine that a second client device is not presenting a first part of the audio. Based on the determination, the instructions may be executable to send a first part of the transcription to the second client device and/or to present the first part the transcription at the second client device.

20 Claims, 9 Drawing Sheets

PRESENTATION OF PART OF TRANSCRIPT BASED ON DETECTION OF DEVICE NOT PRESENTING CORRESPONDING AUDIO

FIELD

The disclosure below relates to technically inventive, non-routine solutions that are necessarily rooted in computer technology and that produce concrete technical improvements. In particular, the disclosure below relates to presentation of part of a transcript based on detection of a device as not presenting the corresponding audio.

BACKGROUND

As recognized herein, video conferences present a unique set of issues that do not necessarily arise with in-person conferences. As further recognized herein, among these issues is that network faults and limited bandwidth can interrupt the video conference, resulting in certain audio spoken by one conferee being missed by the other conferees. There are currently no adequate solutions to the foregoing computer-related, technological problem.

SUMMARY

Accordingly, in one aspect an apparatus includes at least one processor and storage accessible to the at least one processor. The storage includes instructions executable by the at least one processor to receive, from a first client device, a transcription of audio. The audio is detected at the first client device, and the audio is streamed from the first client device as part of a video conference. The instructions are also executable to determine that a second client device is not presenting a first part of the audio and, based on the determination, present a first part the transcription at the second client device.

Thus, in certain example implementations the apparatus may include a video conferencing server. If desired, in these implementations the instructions may then be executable to present the first part of the transcription at the second client device by controlling video conferencing software executing at the second client device to present the first part of the transcription.

Also in certain example implementations, the apparatus may include the second client device. If desired, in these implementations the instructions may be executable to present the first part of the transcription by controlling a display of the second client device to present the first part of the transcription.

In some examples, the first part of the transcription may match words spoken during the first part of the audio that is not presented at the second client device.

Additionally, in various example embodiments, the instructions may be executable to determine that the second client device is not presenting the first part of the audio based on network data, based on user input to the second client device, and/or based on a vote of plural conferees of the video conference.

Still further, in some examples the transcription may be a first transcription and the instructions may be executable to determine, based on a comparison of the first part of the first transcription to a first part of a second transcription, that the second client device is not presenting the first part of the audio. So, for example, the first part of the first transcription and the first part of the second transcription may both relate to the first part of the audio, and the first part of the second transcription may be generated at the apparatus based on the first part of the audio as received in an audio stream from the first client device.

In another aspect, a method includes receiving, from a first client device, a transcription of audio. The audio is detected at the first client device, and the audio is streamed from the first client device as part of a video conference. The method also includes determining that a second client device is not presenting a first part of the audio and, based on the determining that the second client device is not presenting the first part of the audio, sending a first part the transcription to the second client device for presentation at the second client device.

Accordingly, in certain example implementations the method may include presenting the first part of the transcription at the second client device by controlling the second client device to present text of the first part of the transcription on a display of the second client device. Additionally or alternatively, the method may include presenting the first part of the transcription at the second client device by executing text to speech software to audibly present the first part of the transcription via a speaker of the second client device.

Furthermore, in some examples the method may include continuing to send respective parts of the transcription to the second client device while respective parts of the audio are not being presented at the second client device, and then determining that a second part of the audio is being presented at the second client device. Based on determining that the second part of the audio is being presented at the second client device, the method may include ceasing to send parts of the transcription to the second client device.

In still another aspect, at least one computer readable storage medium (CRSM) that is not a transitory signal includes instructions executable by at least one processor to receive, from a first client device, a transcription of audio. The audio is detected at the first client device. The instructions are also executable to determine that a second client device is not presenting a first part of the audio and, based on the determination that the second client device is not presenting the first part of the audio, send a first part the transcription to the second client device for presentation at the second client device.

In certain example embodiments, the instructions may be executable to control the second client device to present the first part of the transcription at the second client device responsive to and during a pause in a user of the first client device speaking as part of the audio. Additionally or alternatively, the instructions may be executable to control the second client device to present the first part of the transcription at the second client device responsive to and during a break in a video conference, where the audio forms part of the video conference. As yet another example, the instructions may be executable to control the second client device to present the first part of the transcription at the second client device in real time while the first part of the audio is to be presented at the second client device.

What's more, in certain examples the instructions may be executable to control the second client device to present the first part of the transcription at the second client device by executing text to speech software to audibly present the first part of the transcription at the second client device as part of a non-video telephone call between the first and second client devices.

The details of present principles, both as to their structure and operation, can best be understood in reference to the accompanying drawings, in which like reference numerals refer to like parts, and in which:

DETAILED DESCRIPTION

Figure 1:
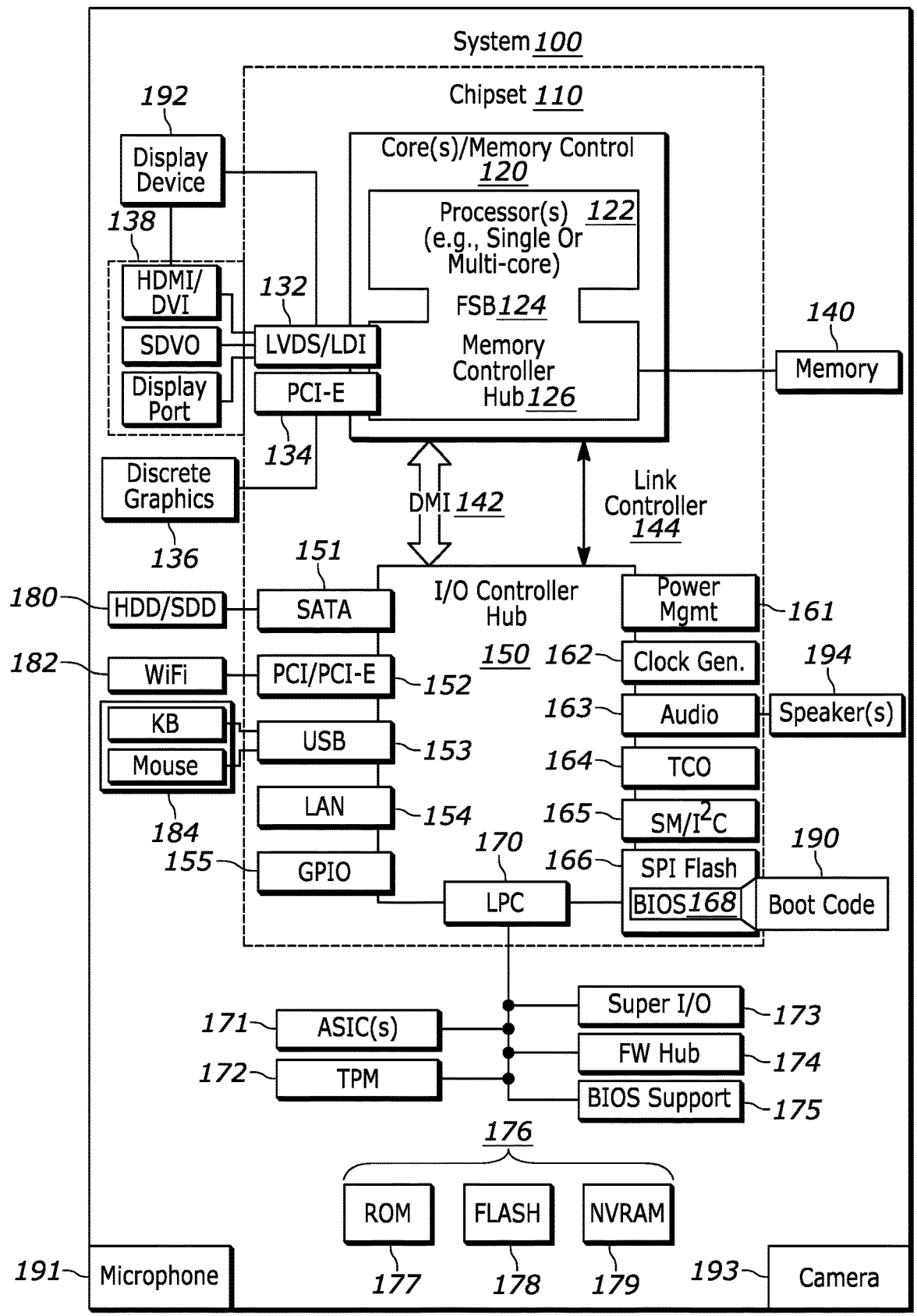
FIG. 1 is a block diagram of an example system consistent with present principles.

Among other things, the detailed description below discusses intelligently sending text transcriptions of a user's audio in situations where that user's audio is determined to be bad as it may not be presented to others as part of a video conference. So, for example, the speaking user's conferencing client may actively transcribe what is being said by the speaking user. Thus, the audio may be transcribed directly on the speaker's device before any network conditions can cause issues. The transcription may then be sent to the server via a connection such as a web socket connection or data channel via WebRTC.

The server may then use network data and other information to determine when a user's audio is bad. This can include network analysis, segmented transcription comparison etc. As far as network analysis goes, the server/devices may measure network-related statistics such as jitter, round trip time (that might indicate undue latency), and packet loss, and then correlate that to the audio not being presented to other conference attendees. Detection of bad audio may also be determined based on user input, such as another person clicking a button stating to the speaking user that they have been told their audio is bad by other users on the conference. Other attendees in the conference may even use a voting system to indicate that a given speaker's audio is bad.

Thus, once a determination is made that a speaking user's audio is bad, the transcription of that audio may be sent by the server to the other attendees in the conference. The server may then control the conferencing software at the client device to present the transcription as text on a display as part of the conferencing software and/or present the transcription as audio through the conferencing software.

Presentation of the transcription may then continue until a determination is made that the speaking user's audio is good again. When that determination is made, the transcription may no longer be sent to the other attendees' client devices.

What's more, recordings of conferences may also be enhanced. Thus, when a speaker's audio is determined to be bad, the text transcription may be read by a text-to-speech program and injected into the recorded audio. What's more, present principles may be used not just for video conferences but for other types of communications and recordings as well, such as audio-only telephone calls.

Accordingly, network communications may be enhanced to permit effective comms even when network issues exist, improving the functionality of the overall network itself and avoiding instances where the speaking user would have to repeat themselves.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C# or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include an audio receiver/microphone 191 that provides input from the microphone 191 to the processor 122 based on audio that is detected, such as via a user providing audible input to the microphone as part of a video conference and for other purposes. The system 100 may also include a camera 193 that gathers one or more images and provides the images and related input to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather still images and/or video for video conferencing and other purposes.

Additionally, though not shown for simplicity, in some embodiments the system 100 may include a gyroscope that senses and/or measures the orientation of the system 100 and provides related input to the processor 122, as well as an accelerometer that senses acceleration and/or movement of the system 100 and provides related input to the processor 122. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
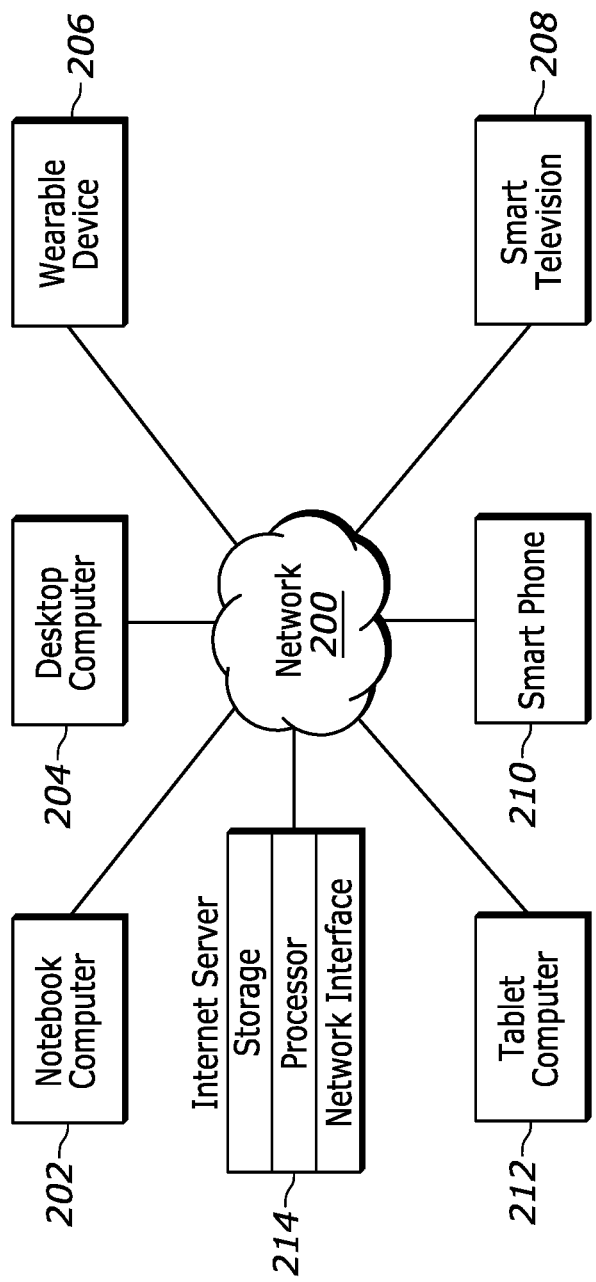
FIG. 2 is a block diagram of an example network of devices consistent with present principles.

Turning now to FIG. 2, example devices are shown communicating over a network 200 such as the Internet for video conferencing and transmission of audio transcriptions consistent with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a video conferencing server 214 that may be an Internet server routing audio video (A/V) streams between the client devices 202-212 for video conferencing. It is to be understood that the devices 202-214 may thus be configured to communicate with each other over the network 200 to undertake present principles.

Figure 3:
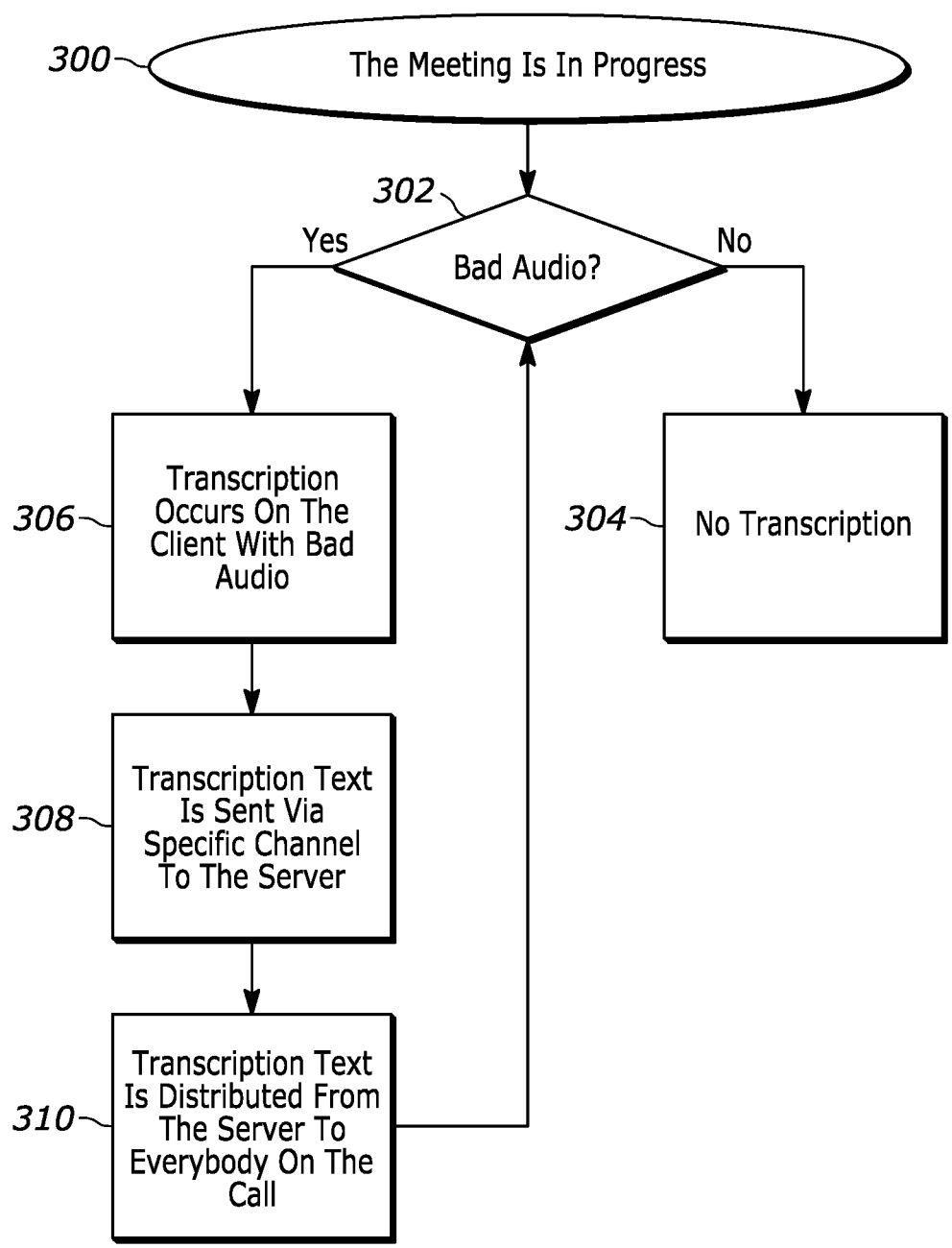
FIG. 3 illustrates example overall logic in example flow chart format that may be executed consistent with present principles.

Referring to FIG. 3, it shows example overall logic that may be executed by one or more devices during a video conference consistent with present principles. The logic may be executed to present a transcription to video conference conferees for portions of the conference for which audio is not being presented for whatever reason. Note that while the logic of FIG. 3 is shown in flow chart format, other suitable logic may also be used.

As shown, at step 300 a video conference is in progress. Then at decision diamond 302 the system may determine whether audio for a first part of the video conference is bad. As indicated above, bad audio may be established by audio that is not presented at the respective client devices of the conferees as it should be, whether that be for less than a second, or a minute or more. Audio of the conference not being presented may include the speaking conferee's voice not being presented even if distorted, unintelligible audio is still presented, or if no audio for the speaking conferee at all is presented (e.g., where packets were dropped somewhere along the transmission over the network).

Responsive to a negative determination at diamond 302, the logic may proceed to block 304 where the system may decline to present a transcription of part of the audio and simply continue presenting the video conference as it otherwise would. However, responsive to an affirmative determination at diamond 302, the logic may instead proceed to block 306.

At block 306 the client device of the conferee that is speaking but has bad audio (as presented to others) may locally transcribe, at that client device, the conferee's speech using speech to text software (e.g., a digital assistant specifically, such as Amazon's Alexa, Google's Assistant, or Apple's Siri). The conferee's speech may be transcribed locally at his/her client device so that the transcription may be relatively more accurate than if the transcription was done at a network server or other client device after transmission of the corresponding audio over the network (e.g., where audio packets of the conferee's speech might have been dropped or received out of order during transmission, resulting in an incomplete or inaccurate transcription).

From block 306 the logic may then proceed to block 308 where the client device may send the transcribed text to a server being used to facilitate the video conference. In some examples, the text may be sent using a specific channel, such as a web socket connection or data channel via WebRTC. Then at block 310 the system may distribute the transcription text from the server to the client devices of one or all other conferees participating in the video conference. The logic may then return to decision diamond 302 to proceed again therefrom for latter portions of the video conference.

Figure 4:
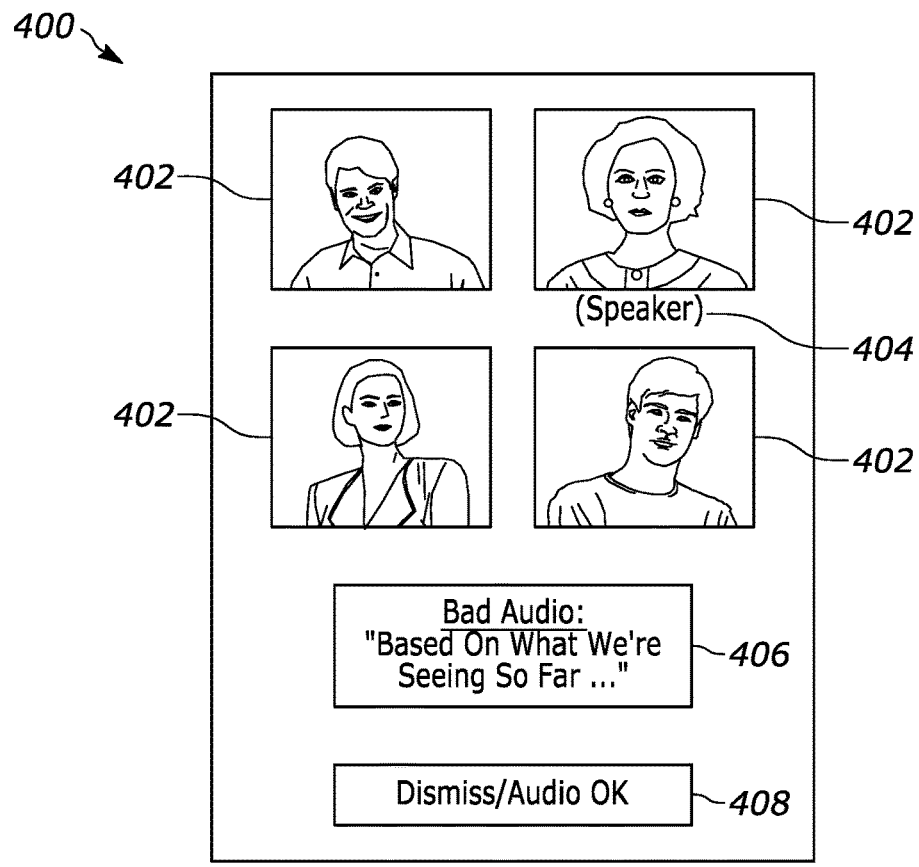
FIGS. 4-7 and 10 illustrate various example graphical user interfaces (GUIs) that may be presented during a video conference consistent with present principles.

FIG. 4 shows an example graphical user interface (GUI) 400 that may be presented on the display of a client device while a video conference conferee listens to another conferee speak as part of the conference. As shown, respective real-time video feeds 402 of the other conferees participating in the conference may be presented, and the GUI 400 may dynamically update over time based on whomever is speaking to present a text indication 404 of the conferee that is currently speaking.

As further shown in FIG. 4, the GUI 400 may also include an overlay window 406. The window 406 may present text from a transcription of a first part of the conference audio that includes the voice of the conferee that is currently speaking. The window 406 may be presented responsive to that conferee's audio being bad. Note here that, assuming adequate bandwidth for transcription transmission, the text in the window 406 may be presented in real time as the speaking conferee speaks so that the text presented in the window 406 matches words spoken during the audio that is not being presented at the other client devices as it should be. The text may be synced with the audio itself by matching respective timestamps of the audio stream of the speaking conferee with respective timestamps of the transcription as may have been attached to the transcription itself by the speaking conferee's client device.

FIG. 4 also shows that in some examples the GUI 400 may include a selector 408. The selector 408 may be selectable to dismiss the transcribed text/window 406 (e.g., regardless of whether the speaking conferee's audio has improved or not). Additionally or alternatively, the selector 408 may be selectable to provide an indication to the speaking conferee's client device and/or video conferencing server that the audio issues have resolved and that the speaking conferee's audio is being presented again at the other conferee's client device.

Figure 5:
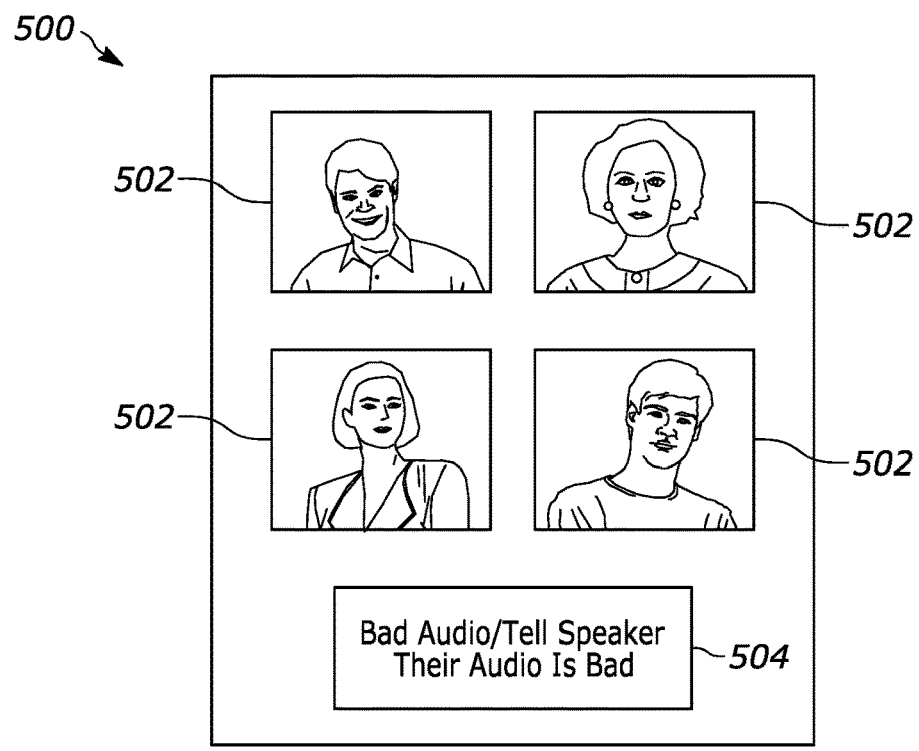

FIG. 5 shows an example GUI 500 that may be presented for a given conferee to provide input indicating that the audio of another conferee that is currently speaking is bad. Here again real-time video feeds 502 of the other conferees are shown. As also shown in FIG. 5, the GUI 500 may include a selector 504 that may be selectable by the user to provide input to the conferencing system that the respective conferee's client device is not presenting a given part of the audio of the other conferee as that conferee speaks. In response, the conferencing server may transmit a portion of the transcription as generated by the speaking conferee's own client device, with the portion corresponding to what the speaking conferee themselves is currently saying.

In some examples, the server may also transmit a threshold amount of the transcription for past speech that matches a threshold amount of time of the speaking conferee speaking that occurred prior to selection of the selector 504 itself. Thus, other conferees may catch up if they do not select the selector 504 immediately upon the audio going bad. For example, the threshold amount of the transcription and the threshold amount of time itself may both correspond to the last five seconds immediately prior to selection of the selector 504. Thus, the flow of the conversation may not be disrupted by asking the speaking conferee to repeat themselves, while at the same time others are still able to appreciate what the speaking conferee has said even if their audio is bad.

Figure 6:
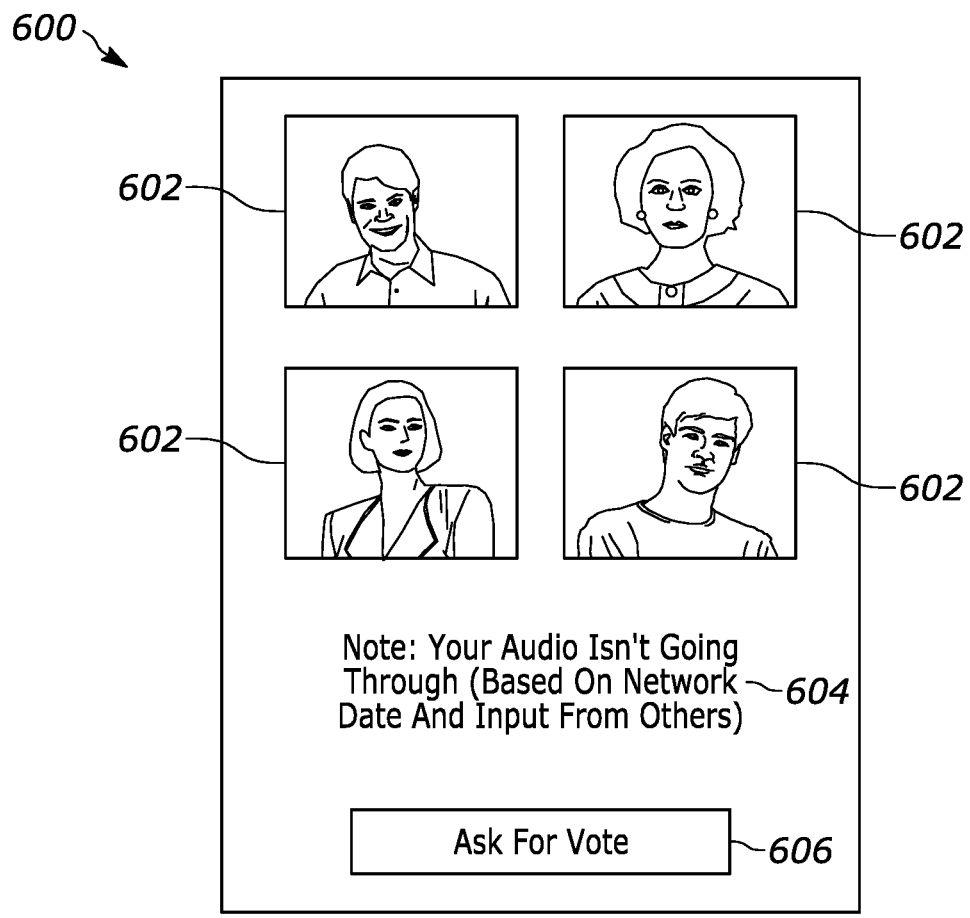

Turning now to FIG. 6, it shows an example GUI 600 that may be presented on the display of the client device of the conferee that is currently speaking but whose audio is not being presented at other client devices as it should be. The GUI 600 may be presented, for example, responsive to selection of the selector 504 from another client device and/or based on an autonomous determination by the system that the speaking conferee's audio is bad (e.g., by comparing received text to text transcribed at the server itself as will be described further below).

As shown in FIG. 6, respective real-time video streams 602 of the other conferees may be presented on the GUI 600. FIG. 6 also shows that the GUI 600 may include an indication 604 that the audio of the conferee who is speaking is not being presented to other conferees as it should be. In some examples, the indication 604 may also indicate one or more reasons why this might be happening and/or, as also shown in FIG. 6, how the system/server determined as much. In the present example, network data has been used to determine that the audio is not being presented to other conferees as it should be (such as based on identification of dropped packets). Also according to the present example, input from other conferees indicating that the speaking conferee's audio is bad has also been used to determine that the audio is not being presented to others.

As further shown in FIG. 6, the GUI 600 may include a selector 606. The selector 606 may be selectable to initiate an electronic vote where other conferees can provide input indicating whether they can hear the speaking conferee's audio at their own respective client devices. Accordingly, FIG. 7 shows an example GUI 700 that may be presented on the displays of the other conferees' client devices to vote.

Figure 7:
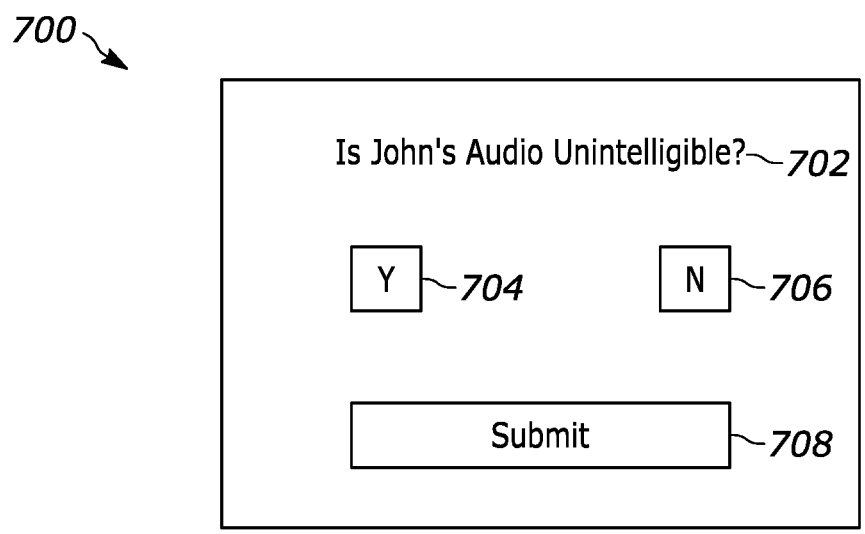

As shown in FIG. 7, the GUI 700 may include a prompt 702 asking whether the speaking conferee's audio (a user named John in this case) is unintelligible. The other conferee may then select either the "yes" selector 704 to respond in the affirmative or the "no" selector 706 to respond in the negative. The user may then select the selector 708 to submit his/her vote to the conferencing server for the server to tally the results.

Then, depending on the responses to the vote, the server may take action by sending part of the transcription of the speaking conferee to the client devices of the other conferees. For example, if a majority of other conferees, or a user-designated threshold percentage of other conferees, are tallied as voting that the speaking conferee's audio is unintelligible, then parts of the transcription may be sent that correspond to the missed/bad audio. The transcriptions may then cease being sent and presented at each client device responsive to any conferee selecting a selector like the selector 408 described above, or responsive to the majority or user-designated threshold percentage of voting conferees selecting the selector 408 for even greater system confidence that the audio or network issues have been resolved.

Figure 8:
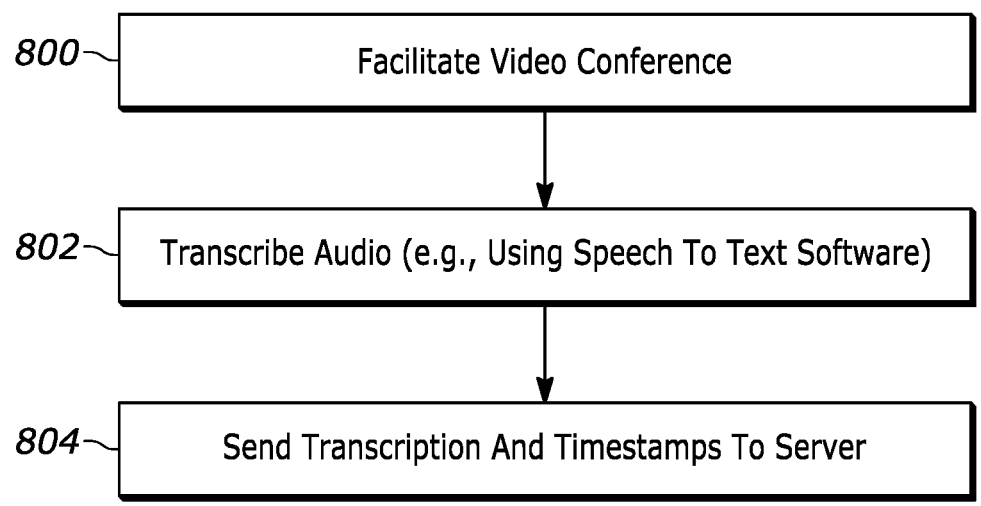
FIG. 8 illustrates example logic in example flow chart format that may be executed by a client device consistent with present principles.

Referring now to FIG. 8, it shows example logic consistent with present principles that may be executed by a client device of a person that is currently speaking as part of a video conference, a telephone call, and/or a recording that will be stored for presentation at a later time. Thus, note that the logic of FIG. 8 may be executed locally by each client device participating in the video conference, etc. Also note that, in some examples, the logic may be executed as part of a video conferencing application ("app") stored locally at that client device for transmitting/receiving audio and video streams of the participants as part of the video conference, telephone call, etc. Further note that while the logic of FIG. 8 is shown in flow chart format, other suitable logic may also be used.

Beginning at block 800, the client device may facilitate a video conference by transmitting its local audio video (A/V) content/streams from its local microphone and camera, respectively, to other client devices of the other conferees (as possibly routed through a coordinating video conferencing server). Also at block 800, the client device may receive A/V streams of the audio and video of the other conferees for local presentation.

Thereafter, the logic may proceed to block 802 where the client device may execute speech to text software to transcribe words spoken by the local user as part of the audio of the video conference. For example, the device may do so using a speech to text application programming interface (API) or using a digital assistant with built-in speech to text functionality (such as Google's Assistant, Apple's Siri, or Amazon's Alexa). Note that the user's audio may be transcribed locally at the client device itself so that the transcription may be as accurate as possible without certain portions of the corresponding audio being corrupted or lost during transmission over a network prior to transcription. Further note that transmitting the transcription itself may consume less bandwidth than transmitting the audio and video feeds from the client device, and so even if the network has issues or limited bandwidth during the conference, this relatively more-accurate transcription may still reach the other client devices even if the corresponding audio is broken up, unintelligible, or otherwise not presented at the other client devices.

From block 802 the logic may then proceed to block 804 where the client device may actually send, to the coordinating server, the transcription as well as timestamps indicating respective times of day at which the respective words of different parts of the transcription were spoken (e.g., down to the tenth or one hundredth of a second). The different parts of the transcription may be streamed in real time (along with their timestamps) as they are generated by the speech to text software at the client device. Or in other examples, threshold amounts of the transcription may be intermittently transmitted, such as transmitting every five second's worth of transcription of the user's speech.

Also note per block 804 that the client device may send the transcription to the server through a web socket connection or data channel via WebRTC. Other out-of-band communication channels may also be used to further ensure the transcription makes it to the other client devices even if there is a network fault or other issue over the primary channel that is being used for transmitting the A/V content itself of the video conference. Thus, for example, the client device may use a cellular network to send the transcription even if a local Wi-Fi network is being used to stream the A/V content.

Figure 9:
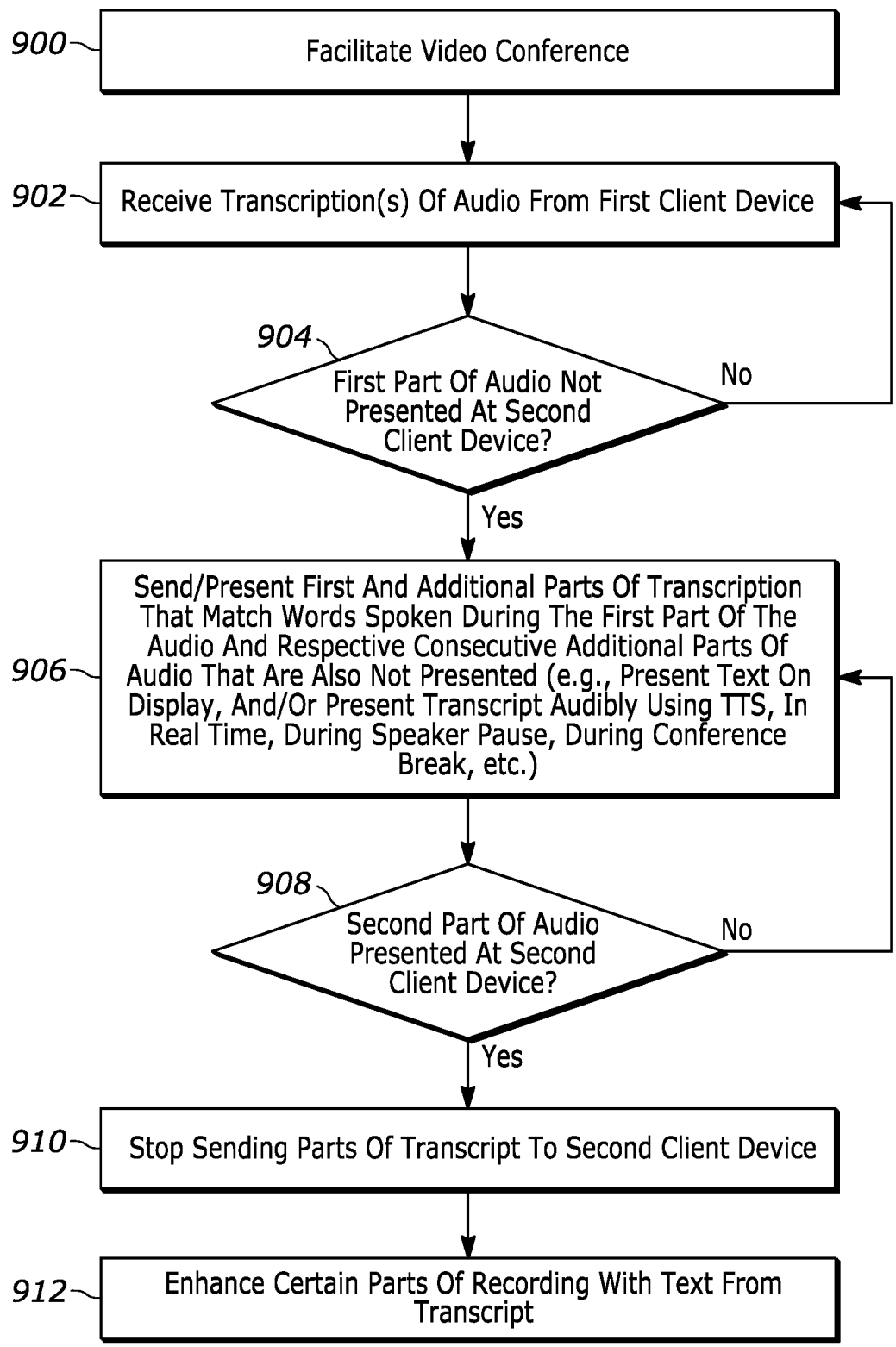
FIG. 9 illustrates example logic in example flow chart format that may be executed by video conferencing server consistent with present principles.

Referring now to FIG. 9, it shows example logic consistent with present principles that may be executed by a conferencing server that routes A/V of various client devices to other client devices on a same video conference, non-video telephone call, etc. However, further note that while a server will be referenced below, in some examples the logic of FIG. 9 may be executed by one client device that receives a transcription generated by another client device along with a corresponding A/V stream from that other client device to then perform the steps below (to control its own display and speakers to present the text of the transcription visually and/or audibly). In any case, note here too that while the logic of FIG. 9 is shown in flow chart format, other suitable logic may also be used.

Beginning at block 900, the server may route the A/V streams from each client device to the other client devices.

Also at block 900, the server may control one or more conferencing-related GUIs as presented locally at each client device as part of local video conferencing software executing at the client device. From block 900 the logic may then proceed to block 902.

At block 902 the server may receive respective transcriptions of respective conferees speaking from their respective client devices. The logic may then proceed to decision diamond 904 where the server may determine whether a first part of the audio from a client device of a respective conferee is not being presented at one or more other client devices participating in the video conference (or phone call).

The determination at diamond 904 may be made a number of ways, alone or in combination for increased system confidence. For example, the server may make the determination autonomously based on analysis of network data, such as a request to the server for A/V packets to be re-sent (indicating a network fault resulting in packet loss). The network data may also include receipt of an indication from one of the client devices that certain packets have been received out of order. Network data regarding other types of jitter may also be analyzed, as may round-trip transmission time and other network statistics that might be available.

Additionally or alternatively, the determination at diamond 904 may be made based on based on a comparison of a first part of a transcription, as generated locally at one of the client devices themselves and received at the server, to a corresponding part of another transcription of the same audio as generated at the server itself using speech to text software and the audio as received from the respective client device. Thus, if the respective parts of the transcriptions relating to the same part of the user's speech do not match, or at least do not match to within a threshold level of tolerance, the server may determine that the respective part of the audio itself is not being presented at other client devices as it should be (e.g., due to a network fault already occurring somewhere along the transmission leg between the sending client device and the server itself).

Another example way in which the determination at diamond 904 may be made is based on user input to one of the other client devices that are presenting the relevant audio. This might include, for example, user inputs related to a vote of plural conferees as described above. For example, an end-user's selection of a selector such as one the selectors 504 or 704 may establish the user input.

Then responsive to a negative determination at diamond 904, the logic may proceed back to block 902 and proceed again therefrom. However, responsive to an affirmative determination at diamond 904, the logic may instead proceed to block 906.

At block 906 the server may, based on the affirmative determination, send and/or present a first part the transcription from the client device that generated it to one or more other client devices participating in the same video conference. For example, the server may send and present the first part of the transcript at the other client devices by controlling a web-based portal accessed at each client device through a web browser to participate in the video conference, and/or by controlling video conferencing software executing at each of the other client devices, to present the first part of the transcript locally at the respective client device. Regardless, note again that the first part of the transcription may match words spoken during the respective part of the audio from which the first part of the transcription was generated but that is not being presented at the other client devices as it should be. Thus, the first part of the transcription may be timed for presentation at the other client devices using timestamps as discussed above.

Further note that in various examples, the first part of the transcript may be presented by controlling each respective client device to present text of the first part of the transcription on a respective display of the respective client device (e.g., as shown in the window 406 described above). Additionally or alternatively, the first part of the transcript may be presented based on the server executing text to speech software to send audio generated from the first part of the transcription to the respective client device for that computer-generated audio to then be presented via one or more respective audio speakers of the other client device. For example, a text to speech API may be used to generate the audio from the first part of the transcript, or a digital assistant with text to speech functionality may be used to do so (such as one of the digital assistants already mentioned above).

Thus, in some examples the first part of the transcript may be audibly presented aloud at each client device in a predetermined, computerized voice (e.g., the designated voice of whatever digital assistant is being used). Or, if desired, a deepfake algorithm may be executed at the server to present the first part of the transcript aloud in a computer-generated version of the voice of the respective user themselves that initially spoke the audio from which the first part of the transcript was generated. Accordingly, note here that the deepfake algorithm may already have access to voice samples of the relevant user and may have already been trained on those voice samples to output a computer-generated version of that user's voice. Or the deepfake algorithm may run in the background during the current video conference to train itself using audio of the user that forms part of the current video conference (but before the user's audio went bad). Regardless, the deepfake algorithm may be executed to enhance the video conference by presenting audio in the speaker's own voice to make it seem to others as though no audio issues are occurring (when in reality they are still occurring).

Also at block 906, the server may continue to send/present additional parts of the transcription of the speaking user's audio as generated locally at that user's client device as long as the audio issues persist that resulted in non-presentation of corresponding consecutive portions of the audio itself at other client devices. Thus, note here that the first part and additional parts of the transcription may be presented in real time as the speaker speaks. However, further note that voice processing software may be executed to identify a pause in that user speaking to then, in response, retroactively present the part(s) of the transcription after the fact (during the pause) for others to catch up on what the user was saying. The pause triggering presentation of the transcript of prior parts of the user's speech may be a pause of any length of time, or a pause of a predetermined threshold amount of time (such as two seconds) so that the transcription is not flashed for only brief presentation during a split-second pause (which may be confusing and presented too quick to be read anyway).

Also note that the voice processing software may be executed to identify a break in the video conference itself, such as by executing natural language processing to identify one of the conferees verbally or textually announcing a 5-minute break in the conference. Additionally or alternatively, the server may determine based on the current time of day and an electronic calendar/agenda entry for the conference that a scheduled break in the conference has been reached, and responsive to that determination the server may retroactively present the part(s) of the transcription during the break for others to catch up on what the relevant user was saying. However, in some specific examples according to this implementation, the scheduled break time may be required to be reached and also the server may also have to identify that none of the conferees are currently speaking to then present the transcript text in response (so as to not confuse or annoy people, should the conferees continue speaking into the designated break time).

Still in reference to FIG. 9, from block 906 the logic may proceed to decision diamond 908. At diamond 908 the server may determine whether a second, subsequent part of the audio of the same user (that previously had bad audio) is now being presented at other client devices. This determination may also be made using techniques similar those described above in reference to diamond 904. For example, network data may be analyzed, local and remotely-generated transcripts relating to the same part of the user's audible speech may be compared, and/or user input to a selector like the selectors 408 or 706 may be used.

A negative determination at diamond 908 may cause the logic to revert back to block 906 to continue sending/presenting respective parts of a transcription for respective consecutive portions of audio of the same user speaking while those portions of the audio are not being presented at the other client devices for whatever reason. Then once an affirmative determination is made at diamond 908, the logic may proceed to block 910.

At block 910, the server may cease sending/presenting parts of the transcription at the other client devices (at least until another audio issue is detected that results in non-presentation of the same or a different user's audio). Thereafter, the logic may revert back to block 900 to proceed again therefrom. Or in certain examples, the logic may proceed to block 912.

At block 912 the server may enhance various parts of a recording of the video conference, telephone call, etc. with text and/or audio generated from the transcript(s). For example, the video conference's A/V recording may be stored to persistent storage located at the server after the conference has ended so that other people can go back later and watch the video conference. But the same audio issues that occurred during the conference itself may have resulted certain audio still not being presented in the recording either, and so parts of the transcript may be presented only during those respective portions of the recorded conference. For example, for the recording, the transcript text for bad audio portions may be presented as subtitles, and/or a deepfake version of the speaking user's voice may be generated from the transcript text and then injected into the audio of the recording at the appropriate times to match when the user actually spoke the corresponding words themselves.

Accordingly, in relation to transcript text specifically whether presented in real time during the conference or later in the recording itself, it may be appreciated that by only presenting as text certain parts of the transcript that relate to corresponding bad audio parts (rather than presenting transcript text for all speech/audio of the conference), the transcript text does not remove peoples' focus from other aspects of the conference when the transcript text may not be needed. Thus, a person's full attention may not be unnecessarily drawn to reading the transcript text rather than paying attention to other aspects of the conference such as screen sharing, camera feeds of the other participants, etc. Present principles also recognize that reading large amounts of text can be very time consuming and people may have trouble keeping up depending on the pace of the corresponding audible speech itself, and so the foregoing technique avoids this as well by presenting relatively smaller amounts of text of the transcription which are much easier to read/understand quickly when compared to large paragraphs of text that might otherwise be presented. The foregoing also helps in that lost portions of audio are displayed as text to the users right away during the conference, thus avoiding situations where a speaking conferee might speak for a long time and others may not alert that person of the bad audio until much later (where the others might have to stop the speaker and say "you were breaking up off and on over the past 5 minutes, could you repeat that?").

Figure 10:
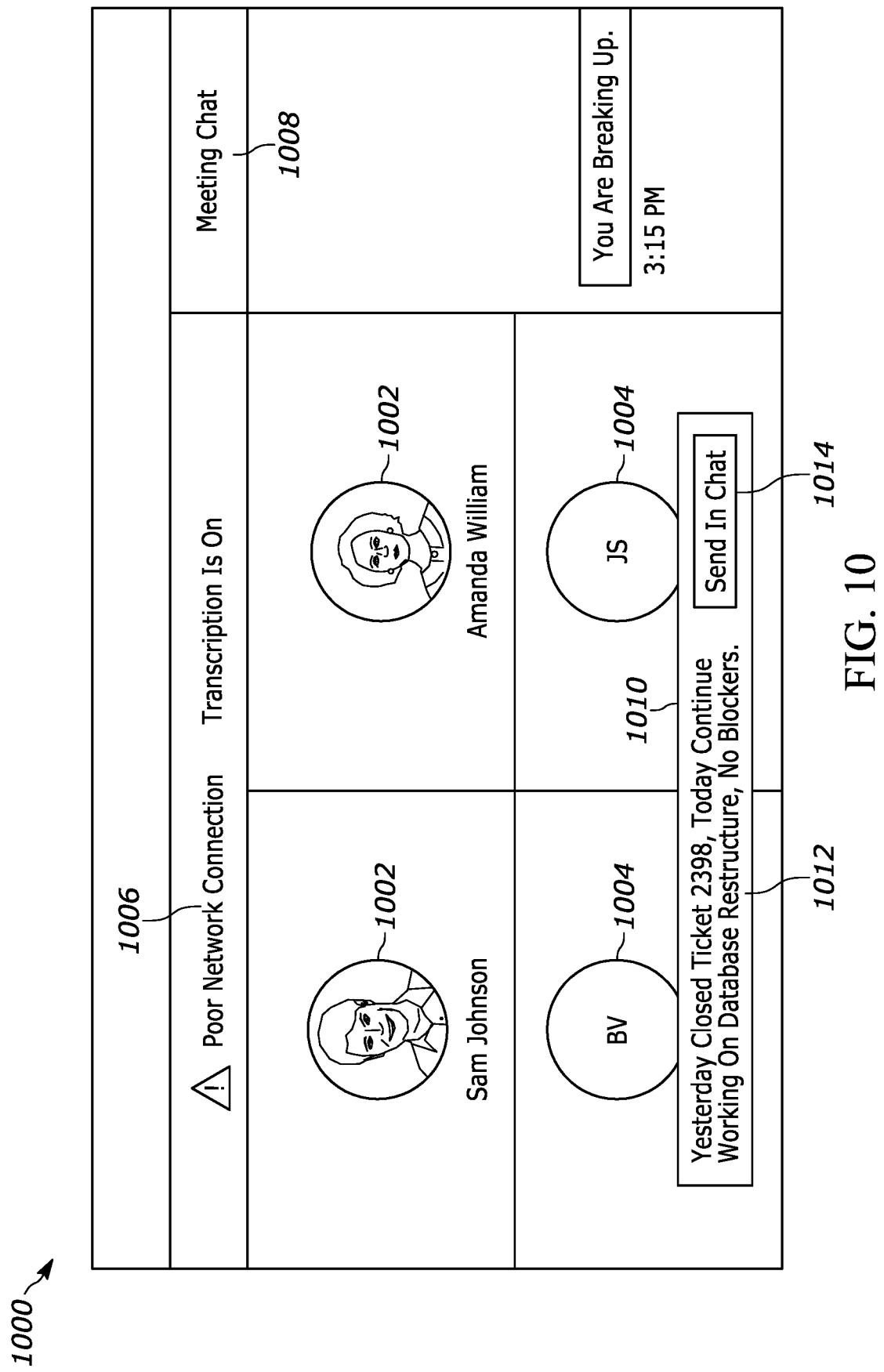

Now in reference to FIG. 10, it shows another example GUI 1000 consistent with present principles that may be presented on the display of a client device of a speaking user for which their audio is not being presented at other client devices. Again real time video feeds and name identifiers 1002 may be presented for certain conferees, while graphical icons 1004 may also be presented that represent other people for which video is unavailable. An icon and text indication 1006 may also be presented as part of the GUI 1000 to indicate that a poor network connection exists and that transcriptions are being used to assist with audio data that might otherwise be missed by one or more of the conferees.

As also shown in FIG. 10, the GUI 1000 may include a chat box 1008 that may be used by the conferees for text chatting/messaging during the conference. Thus, a pop-up window 1010 may be presented and may include text 1012 that forms part of a transcript that was generated from speech that other people missed due to the poor connection. The window 1010 may therefore be presented responsive to detecting the poor network connection via network data. Additionally or alternatively, the window 1010 may be presented responsive to execution of natural language understanding on certain message content presented in the chat box 1008 to identify the bad network connection from the text chatting (e.g., using topic segmentation).

The speaking user that spoke the corresponding words of the text 1012 itself may then select the selector 1014 to insert the text 1012 into the chat box 1008 for others to read the transcript text in the chat box 1008. However, further note that in other examples the speaking user need not select the selector 1014 (and the window 1010 need not even be presented), and instead the device might autonomously insert the text 1012 into the chat box 1008 and caption the text as being spoken by the relevant user.

Figure 11:
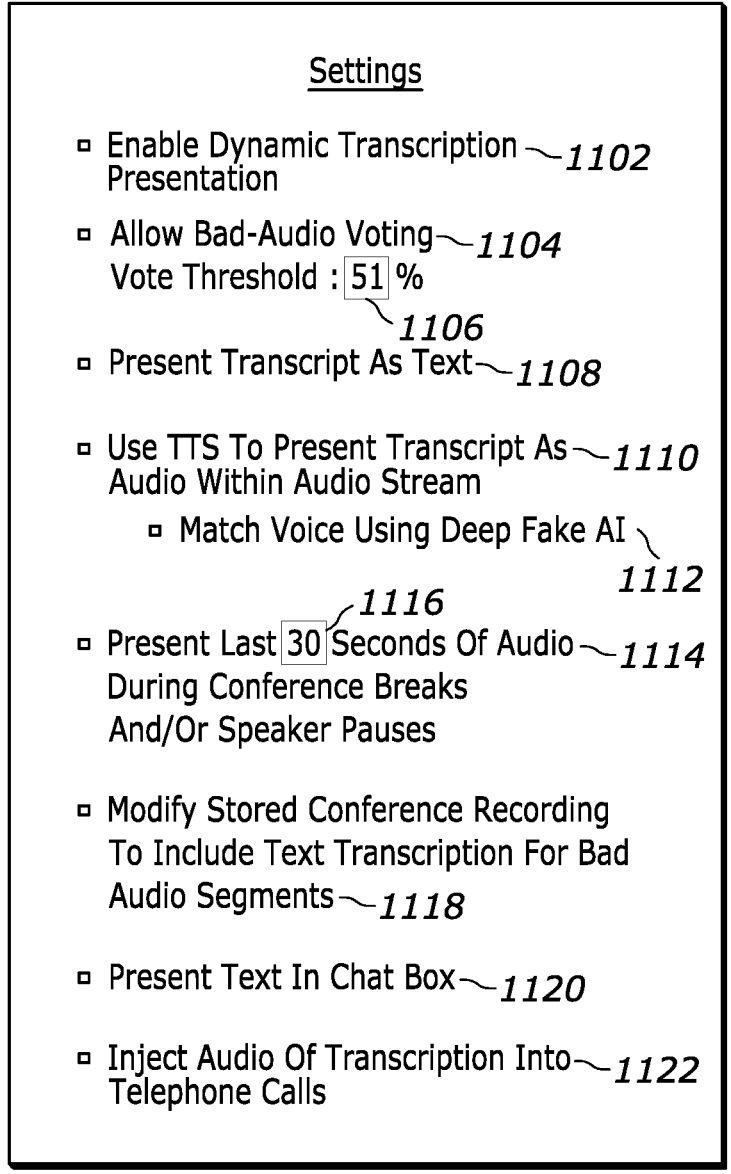
FIG. 11 shows an example GUI that may be presented on a display to configure one or more settings of a device/system to operate consistent with present principles.

Continuing the detailed description in reference to FIG. 11, it shows an example settings graphical user interface (GUI) 1100 that may be presented on a display of a client device, or even display of a server, to configure one or more settings for conferencing, telephone calls, recordings, etc. consistent with present principles. For example, the GUI 1100 may be presented on a display of the device undertaking the logic of FIGS. 8 and/or 9.

The settings GUI 1100 may be presented to set or enable one or more settings of the device to operate consistent with present principles. It may be reached by navigating an app menu or a settings menu of the device, for example. Also note that in the example shown, each option or sub-option discussed below may be selected by directing touch or cursor input to the respective check box adjacent to the respective option.

Accordingly, as shown in FIG. 11, the GUI 1100 may include an option 1102 that may be selectable a single time to set or configure the device, system, software, etc. to undertake present principles for multiple future telephone calls, conferences, or recordings. For example, selection of the option 1102 may configure the device to execute the logic of FIGS. 8 and/or 9.

As also shown in FIG. 11, the GUI 1100 may include an option 1104 to specifically enable the feature of voting on bad audio as described above. Thus, for example, selection of the option 1104 may cause GUIs like the GUIs 600 and 700 to be presented based on a determination of bad audio. If desired, the end-user may even direct numerical input to input box 1106 to establish a vote threshold to use to make a determination of bad audio as also described above.

Still further, the GUI 1100 may include an option 1108 that may be selectable to set or configure the device to present transcript parts as text, as well as an option 1110 that may be selectable to set or configure the device to present transcript parts as audio within an audio stream for the conference, telephone call, etc. using text to speech. If desired, sub-option 1112 may even be selected to specifically set or configure the device to use a deepfake algorithm for generating audio from the text to mimic the associated speaking user's own voice as described above.

FIG. 11 also shows that the GUI 1100 may include an option 1114 that may be selectable to set or configure the device to present transcript parts for a preceding, threshold amount of audio during conference breaks and speaker pauses as also described above. Accordingly, numerical input may be directed to input box 1116 for the user to set the threshold as a most-recent thirty seconds of actual speech that was not presented at other devices (or another user-designated amount).

If desired, the GUI 1100 may also include an option 1118 that may be selectable to configure the device to modify stored recordings to include text transcriptions at various segments that have bad audio as described above. Still further, the GUI 1100 may include an option 1120 to present transcript text specifically in a video conference chat box as described above (e.g., rather than on another portion of the conferencing GUI as shown in FIG. 4). What's more, an option 1122 may be presented to specifically set or configure the device to inject audio generated from a transcription into non-video or audio-only telephone calls, whether the calls are VoIP calls, cellular telephone calls, and/or land-line telephone calls.

Moving on from FIG. 11, also note consistent with present principles that certain parts of a transcript may be presented not just responsive to detection of network issues, user input to selectors, etc. as described above, but also sometimes responsive to identifying one or more of the other conferees audibly speaking or text chatting that they cannot understand or hear the speaking person. This may be identified using natural language understanding and topic segmentation/recognition, for example. In these examples, the transcript may be presented only to the user that indicates that they cannot understand or hear the speaking person, or may be presented to all other participants in the video conference or telephone call.

It may now be appreciated that present principles provide for an improved computer-based user interface that increases the functionality and ease of use of the devices disclosed herein while ensuring that network faults and other factors do not lead to missed audio information. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. An apparatus, comprising:
at least one processor; and
storage accessible to the at least one processor and comprising instructions executable by the at least one processor to:
receive, at a server and from a first client device, a first transcription of audio, the audio detected at the first client device, the audio streamed from the first client device as part of a video conference;
determine, at the server and based on a comparison of a first part of the first transcription to a first part of a second transcription, that a second client device is not presenting a first part of the audio, the first part of the second transcription being generated at the server; and
based on the determination, present the first part of the first transcription at the second client device in real time while the first part of the audio is to be presented at the second client device.

2. The apparatus of claim 1, wherein the apparatus comprises the server.

3. The apparatus of claim 2, wherein the apparatus comprises the second client device.

4. The apparatus of claim 1, wherein the first part of the first transcription and the first part of the second transcription both relate to the first part of the audio, the first part of the second transcription being generated at the server based on the first part of the audio as received in an audio stream from the first client device.

5. The apparatus of claim 1, wherein the instructions are executable to:
determine, based on user input to the second client device, that the second client device is not presenting the first part of the audio.

6. The apparatus of claim 1, wherein the instructions are executable to:
determine, based on a vote of plural conferees of the video conference, that the second client device is not presenting the first part of the audio.

7. A method, comprising:
receiving, at a server and from a first client device, a first transcription of audio, the audio detected at the first client device, the audio streamed from the first client device as part of a video conference;
determining, at the server and based on a comparison of a first part of the first transcription to a first part of a second transcription, that a second client device is not presenting a first part of the audio, the first part of the second transcription being generated at the server; and
based on the determination, sending the first part the transcription to the second client device for presentation at the second client device in real time while the first part of the audio is to be presented at the second client device.

8. The method of claim 7, wherein the first part of the first transcription and the first part of the second transcription both relate to the first part of the audio, the first part of the second transcription being generated based on the first part of the audio as received in an audio stream from the first client device.

9. The method of claim 7, wherein the method comprises:
determining, based on a vote of plural conferees of the video conference, that the second client device is not presenting the first part of the audio.

10. The method of claim 7, wherein the method comprises determining, based on user input to the second client device, that the second client device is not presenting the first part of the audio.

11. At least one computer readable storage medium (CRSM) that is not a transitory signal, the at least one computer readable storage medium comprising instructions executable by at least one processor to:
receive, at a server and from a first client device, a first transcription of audio, the audio detected at the first client device;
determine, at the server and based on a comparison of a first part of the first transcription to a first part of a second transcription, that a second client device is not presenting a first part of the audio, the first part of the second transcription being generated at the server; and
based on the determination, send the first part the first transcription to the second client device for presentation at the second client device in real time while the first part of the audio is to be presented at the second client device.

12. The at least one CRSM of claim 11, wherein the instructions are executable to:
control the second client device to present the first part of the first transcription at the second client device responsive to and during a pause in a user of the first client device speaking while the audio continues to be presented.

13. The at least one CRSM of claim 11, wherein the instructions are executable to:
control the second client device to present the first part of the first transcription at the second client device responsive to and during a user-indicated break in a video conference, the audio forming part of the video conference.

14. The at least one CRSM of claim 13, wherein the user-indicated break is a scheduled break in the video conference.

15. The at least one CRSM of claim 14, wherein the scheduled break is identified from one or more of: an electronic calendar entry for the video conference, an agenda entry for the video conference.

16. The at least one CRSM of claim 13, wherein the user-indicated break is announced in user speech as recognized by the at least one processor via natural language processing.

17. The at least one CRSM of claim 11, wherein the instructions are executable to:
determine, based on a vote of plural conferees of a video conference, that the second client device is not presenting the first part of the audio.

18. The at least one CRSM of claim 11, wherein the first part of the first transcription and the first part of the second transcription both relate to the first part of the audio, the first part of the second transcription being generated based on the first part of the audio as received in an audio stream from the first client device.

19. The at least one CRSM of claim 11, wherein the instructions are executable to:
determine, based on user input to the second client device, that the second client device is not presenting the first part of the audio.

20. The at least one CRSM of claim 11, wherein the instructions are executable to:
    determine, based on a vote of one or more conferees of a video conference, that the second client device is not presenting the first part of the audio.

* * * * *